US011341358B2

(12) United States Patent
Scriven et al.

(10) Patent No.: US 11,341,358 B2
(45) Date of Patent: May 24, 2022

(54) MULTICLASSIFICATION APPROACH FOR ENHANCING NATURAL LANGUAGE CLASSIFIERS

(71) Applicant: International Business Machines Corporation, Armonk, NY (US)

(72) Inventors: Gerhardt Jacobus Scriven, Frisco, TX (US); Marcos Paulo Vieira Ferreira, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 16/587,183

(22) Filed: Sep. 30, 2019

(65) Prior Publication Data

US 2021/0097335 A1 Apr. 1, 2021

(51) Int. Cl.
*G06K 9/62* (2022.01)
*G06N 20/00* (2019.01)
*G06F 40/30* (2020.01)

(52) U.S. Cl.
CPC .......... *G06K 9/6222* (2013.01); *G06F 40/30* (2020.01); *G06K 9/6257* (2013.01); *G06N 20/00* (2019.01)

(58) Field of Classification Search
CPC .. G06K 9/6222; G06K 9/6257; G06K 9/6218; G06K 9/6256; G06K 9/6267; G06F 40/30; G06F 40/20; G06N 20/00; G06N 5/02; G06N 3/0445; G06N 3/0454; G06N 3/049; G06N 3/08
See application file for complete search history.

(56) References Cited

U.S. PATENT DOCUMENTS

| 7,894,677 B2 | 2/2011 | Konig |
| 8,583,416 B2 | 11/2013 | Huang |
| 8,924,313 B2 | 12/2014 | Chidlovskii |

(Continued)

OTHER PUBLICATIONS

Li et al., "Building a Decision Cluster Classification Model for High Dimensional Data by a Variable Weighting k-Means Method", 21st Australasian Joint Conference on Artificial Intelligence Auckland, New Zealand, Dec. 1-5, 2008 Proceedings, pp. 337-347. (Year: 2008).*

(Continued)

*Primary Examiner* — Qian Yang
(74) *Attorney, Agent, or Firm* — Randy E. Tejeda

(57) ABSTRACT

In an approach to creating models utilizing optimally clustered training sets, one or more computer processors determine an optimal cluster size. The one or more computer processors generate one or more clusters from one or more classes and respectively associated training statements that are contained in a training set, based on the determined optimal cluster size, wherein the one or more generated clusters, respectively, contain fewer classes than the training set. The one or more computer processors identify one or more isolated high confidence classes and associated training statements from one or more cluster classifications generated by a static model trained with the one or more generated clusters. The one or more computer processors create one or more dynamic models trained with the one or more identified isolated high confidence classes. The one or more computer processors perform one or more classifications utilizing the one or more created dynamic models.

20 Claims, 5 Drawing Sheets

(56) References Cited

U.S. PATENT DOCUMENTS

| | | |
|---|---|---|
| 10,162,879 B2 | 12/2018 | Niculescu-Mizil |
| 2014/0012849 A1 | 1/2014 | Ulanov |
| 2016/0217344 A1* | 7/2016 | Misra .................... G06K 9/623 |
| 2016/0300135 A1* | 10/2016 | Moudy .................. G06F 40/20 |
| 2018/0075368 A1* | 3/2018 | Brennan ................ G06N 20/00 |
| 2018/0107729 A1* | 4/2018 | Vyas ...................... G06N 20/00 |
| 2018/0114332 A1* | 4/2018 | Desai ................... G06V 10/454 |
| 2019/0095180 A1* | 3/2019 | Kochura .................. G06F 8/38 |
| 2020/0380380 A1* | 12/2020 | Ramachandran ...... G06N 20/20 |
| 2020/0387755 A1* | 12/2020 | Hagen .................. G06N 3/0454 |

OTHER PUBLICATIONS

Huang et al., "An Interactive Approach to Building Classification Models by Clustering and Cluster Validation", Second International Conference Shatin, N.T., Hong Kong, China, Dec. 13-15, 2000, Proceedings, pp. 23-28 (Year: 1983).*

* cited by examiner

MULTICLASSIFICATION APPROACH FOR ENHANCING NATURAL LANGUAGE CLASSIFIERS

BACKGROUND

The present invention relates generally to the field of machine learning, and more particularly to natural language classifiers.

In machine learning, Naïve Bayes classifiers are a family of simple probabilistic classifiers based on applying Bayes' theorem with strong (Naïve) independence assumptions between the features. Naïve Bayes classifiers are highly scalable, requiring a number of parameters linear in the number of variables (features/predictors) in a learning problem. Naïve Bayes is a simple technique for constructing classifiers: models that assign class labels to problem instances, represented as vectors of feature values, where the class labels are drawn from some finite set. There is not a single algorithm for training such classifiers, but a family of algorithms based on a common principle: all Naïve Bayes classifiers assume that the value of a feature is independent of the value of any other feature, given the class variable. For some types of probability models, Naïve Bayes classifiers can be trained very efficiently in a supervised learning setting. In machine learning and statistics, classification is the problem of identifying to which of a set of categories (sub-populations) a new observation belongs, on the basis of a training set of data containing observations (or instances) whose category membership is known. Examples may include assigning a given email to the "spam" or "non-spam" class and assigning a diagnosis to a given patient based on observed characteristics of the patient (blood pressure, presence or absence of certain symptoms, etc.). Classification is an example of pattern recognition.

In machine learning, classification is an instance of supervised learning (i.e., learning where a training set of correctly identified observations is available). The corresponding unsupervised procedure is known as clustering and involves grouping data into categories based on some measure of inherent similarity or distance. Often, individual observations are analyzed into a set of quantifiable properties, known variously as explanatory variables or features. These properties may variously be categorical (e.g. "A", "B", "AB" or "O", for blood type), ordinal (e.g. "large", "medium" or "small"), integer-valued (e.g. the number of occurrences of a particular word in an email) or real-valued (e.g. a measurement of blood pressure). Other classifiers work by comparing observations to previous observations by means of a similarity or distance function. An algorithm that implements classification, especially in a concrete implementation, is known as a classifier. The term "classifier" sometimes also refers to the mathematical function, implemented by a classification algorithm, that maps input data to a category.

SUMMARY

Embodiments of the present invention disclose a computer-implemented method, a computer program product, and a system for creating and training classification models utilizing optimally clustered training sets. The computer-implemented method includes one or more computer processers determining an optimal cluster size. The one or more computer processors generate one or more clusters from one or more classes and respectively associated training statements that are contained in a training set, based on the determined optimal cluster size, wherein the one or more generated clusters, respectively, contain fewer classes than the training set. The one or more computer processors identify one or more isolated high confidence classes and associated training statements from one or more cluster classifications generated by a static model trained with the one or more generated clusters. The one or more computer processors create one or more dynamic models trained with the one or more identified isolated high confidence classes. The one or more computer processors perform one or more classifications utilizing the one or more created dynamic models.

DETAILED DESCRIPTION

Figure 1:
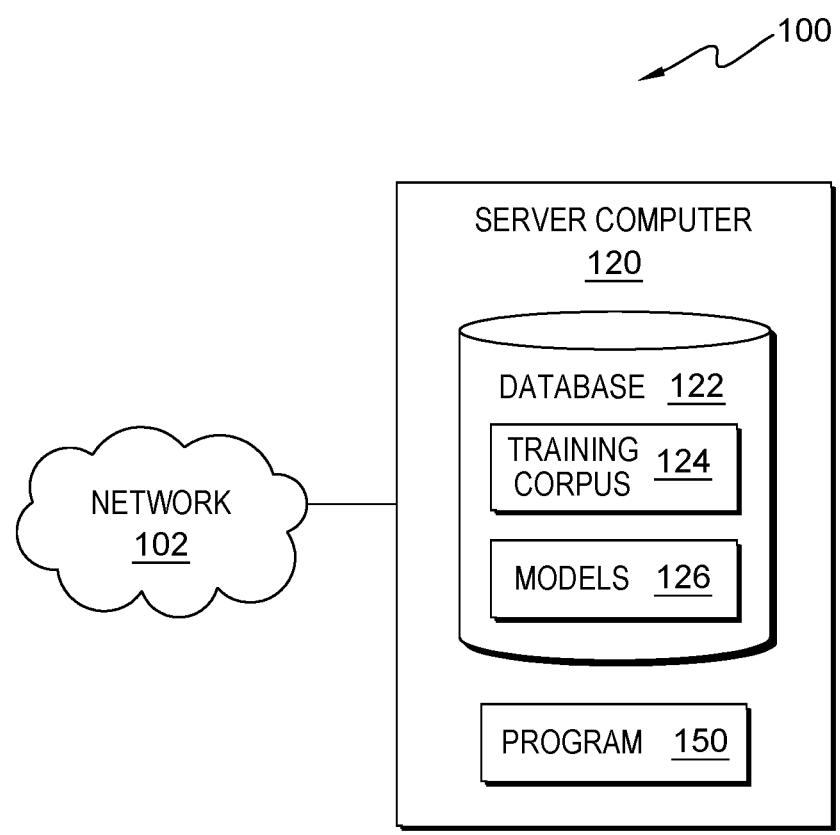
FIG. 1 is a functional block diagram illustrating a computational environment, in accordance with an embodiment of the present invention.

Classification algorithms, models (e.g., Naive Bayes, neural networks, etc.), and classifiers (e.g., natural language classifiers, etc.) suffer from significant performance (e.g., classification execution duration), non-linearly degradation as the number of classes and labels increase. When classification operations are time sensitive, turnaround times for classification may degrade to unacceptable levels. Traditionally, large label or class classification sets and problems are approached utilizing subject matter expert to review and curate a plurality of training sets and train related classification models. Subject matter expert curation is exorbitantly resource intensive, costly, and inefficient endeavors and require large amounts of high confidence (e.g., above 90% confidence) training statements.

Embodiments of the present invention allow systems with limited memory and processing capabilities, such as a mobile device, to train models with prohibitively large class or label sets. Embodiments of the present invention train one or more dynamic models that decrease the amount of time required to execute a classification. Embodiments of the present invention allow for rapid execution of classification tasks without reduction in model precision and accuracy and without any additional training. Embodiments of the present invention split, break, and partition classification tasks into a plurality of smaller classification tasks, executing consecutively. Embodiments of the present invention recognize that deriving an optimal cluster size and training dynamic models based on clustered training sets reduce model processing requirements and execution duration. Embodiments of the present invention are not limited to specific training techniques and algorithms (e.g., supervised, semi-supervised, unsupervised training). Embodiments of the present invention restructure labels and classes such that an original model (e.g., classifier) is replaced with a static model and one or more dynamically trained models, where each dynamic model is a fraction of the size of the original classifier. Embodiments of the present invention recognize that both static and dynamic classifiers are small compared to the original classifier and training the dynamic model in real-time reduces overall computational requirements, thus reduces the amount of time needed to execute the model (e.g., classify). Embodiments of the present invention improve classification efficiency (e.g., speed and system requirements) without any degradation in accuracy. Embodiments of the present invention recognize that once a dynamic model is created, no further training is needed while maintaining high levels of model confidence. Embodiments of the present invention recognize that single layer classification are overly costly in terms of required resources and time. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 5.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as training sets, label distribution data and charts, and historical model accuracy and performance statistics (e.g., execution time, training time). In the depicted embodiment, database 122 contains training corpus 124.

Training corpus 124 may contain one or more sets of one or more instances of classified (e.g., labelled) data, hereinafter referred to as training statements, organized in one or more sets, partitions, arrays, or data structures, hereinafter referred to as training sets. In an embodiment, each training set includes a label and an associated array or set of training statements. The following is an example of a training statement with an associated classification (e.g., label) {cat, [furry, claws, whiskers, purr, pointy ears, chase rats]}. Multiple training statement comprise a training set. In a further embodiment, training corpus 124 contains vectorized (i.e., one-hot encoding, word embedded, dimension reduced, etc.) training sets and associated training statements.

Models 152 contains a plurality of classification models utilized to classify one or more problem instances (e.g., natural language classification, text classification models, etc.). In the depicted embodiment, models 152 contains one or more classification models (e.g., one or more static and dynamic models) trained utilizing supervised training methods. In this embodiment, said models classify (e.g., dog, cat, lizard, etc.) one or more problem instances by considering different features, available as structured or unstructured data. In various embodiments, models 152 may contain transferrable neural networks algorithms and models (e.g., recurrent neural networks, long short-term memory (LSTM), deep stacking network (DSN), convolutional neural networks (CNN), etc.). Program 150 feeds vectorized training sets of feature data to models 152. In various embodiments, the features are labelled with an associated class enabling models 152 to derive what features are correlated to a specific class, prior to use. In an embodiment, models 152 utilizes training sets to generate a set of probabilities denoting the probability of a problem instance belonging to a particular label or class. The training of models 152 is depicted and described in further detail with respect to FIG. 2.

Program 150 is a program for creating and training classification models utilizing optimally clustered training sets. In an embodiment, program 150 defines a taxonomy providing a natural and logical grouping for an original set of labels. In a further embodiment, program 150 assigns a training of the original labels to respective container groups. For example, program 150 may utilizes models 152 to classify text into one of the following animal classes such as dog, cat, lizard, snake, eagle, hawk, spider, crab, shark, etc. In this example, every animal is associated with an animal label and as the number of labels (e.g., animals) increase, model performance suffers. In an embodiment, program 150 redefines group labels that naturally cluster together. Continuing from the above example, dog and cat may cluster under mammal, lizard and snake may cluster under reptile, etc. In the depicted embodiment, program 150 is a stand-alone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122, that may include personal storage devices, data, content, or information the user wishes to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
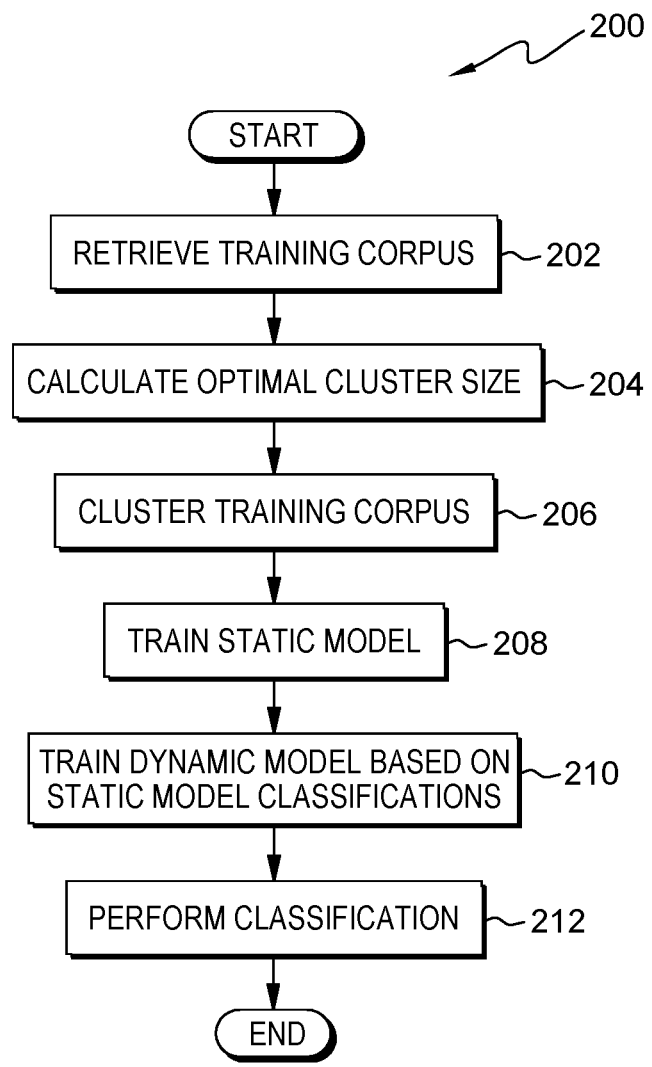
FIG. 2 is a flowchart depicting operational steps of a program, on a server computer within the computational environment of FIG. 1, for creating and training classification models utilizing optimally clustered training sets, in accordance with an embodiment of the present invention.

FIG. 2 is a flowchart depicting operational steps of program 150 for creating and training classification models utilizing optimally clustered training sets, in accordance with an embodiment of the present invention.

Program 150 retrieves a training corpus (step 202). In an embodiment, program 150 initiates when a training of a model is detected. In another embodiment, program 150 initiates based on a user interaction. For example, the user transmits an initiation notification to program 150 to initiate the creation and training of one or more models. In an embodiment, program 150 retrieves one or more training sets from training corpus 124. In another embodiment, program 150 contains one or more training sets. In yet another embodiment, a user inputs one or more training sets into program 150. In an example, program 150 retrieves training sets that include emotion (e.g., happy, sad, concerned, etc.) labels with associated arrays of associated training data (e.g., words associated with each class (e.g., emotion)). As program 150 detects, receives, or retrieves one or more training sets, program 150 calculates training set statistics for each training set. In an embodiment, training set statistics may include, but are not limited to, total training statements, total training labels, frequency of training statements associated with each training label, etc.

Program 150 calculates an optimal cluster size (step 204). Program 150 determines (e.g., calculates) a cluster size that results in the largest time compression (e.g., optimal, quickest execution time) by determining a classifier training duration and classifiers execution of varying training and class, reducing the amount of time required to perform a classification. In this embodiment, lower processing capabilities are required resulting in faster classification times. In an embodiment, program 150, empirically, calculates a formula describing the time taken to perform a classification, allowing program 150 to determine cluster parameters and conditions (e.g. cluster size and label distributions) that minimize the amount of time and, in turn, the processing power required to perform one or more classification tasks. The calculation of said optimal cluster size is further detailed in the steps of flowchart 300.

Accordingly, in this embodiment, program 150 determine cluster parameters and conditions (e.g. cluster size and label distributions) that minimize the processing power required to perform one or more classification tasks, thus reducing the amount of time program 150 requires to perform said one or more classification tasks.

Program 150 clusters the training corpus (step 206). Program 150 utilizes the calculated optimal cluster size to generate one or more clusters containing pluralities of classes contained in the retrieved training corpus. Program 150 restructures the training corpus containing many labels. In a working example, a training corpus contains the following training statements utilized to train an animal classification model: {cat, [furry, claws, whiskers, purr, pointy ears, chase mice]}, {dog [furry, nails, whiskers, bark, floppy ears, chase cats]}, {snake, [scales, poison, hiss, slither, chase mice]}, {crocodile, [scales, swim, run, river, chase deer]}, {eagle, [soar, wings, cry, chase rabbits]}. Continuing, program 150 inputs a series of strings describing a random animal such as "the furry animal has claws and likes to eat mice" and outputs the name of the animal such as "cat". In an embodiment, program 150 creates a plurality of clusters (e.g., class groups or sets) based on one or more common class features or similarities. Continuing from the current example, program 150 creates a plurality of clusters containing generalized animal clusters such as "mammal", "reptile", "bird", "fish", "insect", etc. When program 150 clusters (e.g., joins, combines, etc.) one or more classes, program 150 joins similar and common features that represent the cluster. For example, program 150 creates the following clusters {mammal, [furry, claws, whiskers, purr, pointy ears, chase mice, nails, bark, floppy ears, chase cats]}, {reptile, [scales, poison, hiss, slither, chase mice, swim, run, river, chase deer]}. In an embodiment, each cluster contains links or references for each corresponding class in a cluster. In various embodiments, program 150 sets weights to one or more properties where the same property is found (e.g., "furry" feature in a mammal cluster) such that training feature with added weight is associated with a strong indication membership in a cluster (e.g., "scales" for reptiles, "six legs" or "mandibles" for insects, etc.). In various embodiments, if grouping labels are not practically feasible, program 150 utilizes one or more machine learning clustering techniques (e.g., unsupervised, k-means clustering, mean-shift clustering, hierarchical clustering, etc.) to generate logical containers (e.g., classes) for the original labels. In said embodiments, program 150 generates a label hierarchy systematically without prior knowledge of a taxonomy, allowing an automated clustering and training pipeline.

Program 150 trains a static model (step 208). In various embodiments, program 150 utilizes the clustered training corpus (e.g., container groups such as mammal, reptile, etc.) containing clustered classes and associated training statements, as described in step 206, to create (e.g., train) a static model. Each cluster contains a fraction of labels compared to the original classifier training corpus. Furthermore, where labels are clusters of a label set of the original classifier, said clusters are smaller compared to the original classifier. In an embodiment, program 150 utilizes one-hot encoding techniques to vectorize clustered categorical or string-based (word/term based) feature sets. For example, when vectorizing feature sets of individual words, program 150 creates a one-hot encoded vector comprising a 1×N matrix, where N symbolizes the number of distinguishable terms. In this embodiment, program 150 utilizes one-hot encoding to recode categorical data into a vectorized form. For example, when vectorizing an feature set consisting of [paws, beak, tail], program 150 encodes said corresponding feature set into an array containing [[1,0,0], [0,1,0], [0,0,1]]. In an embodiment, program 150 trains a static model (e.g., models 152) by inputting the clustered feature vectors. For example, program 150 may train the static model utilizing the clustered training set {mammal, [furry, claws, whiskers, purr, pointy ears, chase mice, nails, bark, floppy ears, chase cats]}, {reptile, [scales, poison, hiss, slither, chase mice, swim, run, river, chase deer]}, etc. In another embodiment, program 150 trains a static model with a plurality of feature vectors originating from the clusters extracted from the original training sets (e.g., training corpus 124).

Responsive to program 150 completing training of a static model, program 150 performs an initial clustered (e.g., "top-level") classification (cluster classification) of an unlabeled input (e.g., animal to be classified), made at a container level. In an embodiment, cluster classifications identify one or more isolated high confidence classes and associated training statements. For example, utilizing a cluster classification allows program 150 to classify one or more inputs to a high degree of accuracy. Continuing from the example above, program 150 classifies an animal as a mammal or reptile. Program 150 utilizes said generated cluster classification results to then train a dynamic model, as described below. The training of the static model is followed by a training of a dynamic classifier in real-time utilizing the most confident results from a preliminary cluster classification. Only the most relevant groups are considered and selected for the dynamic model, thus reducing the corresponding training corpus size. In an embodiment, program 150 utilizes a cluster confidence threshold that dictates a minimum confidence required to pass a cluster classification to one or more dynamic models. For example, program 150 determines that both the mammal and reptile cluster are highly probable to contain the correct associated sub-classification (e.g., specifically which animal).

Program 150 trains a dynamic model based on static model classification (step 210). Program 150 trains a dynamic model utilizing only, isolated, high confidence labels (e.g., classes) present (contained) in a cluster classification. In an embodiment, program 150 builds and trains a dynamic natural language classifier in real-time based on the previously trained static model. In this embodiment, program 150 isolates high confidence labels in a preliminary classification (e.g., generated by a static model or previous dynamic model) and reduces the secondary classifier training corpus compared to the original superset (e.g., original training set), thus allowing effective real-time training. In an example, if an input is [furry bark], the secondary classifier (e.g., dynamic model) only contains clustered labels such as dog, cat, and other animals listed under a mammal cluster, however, if the input was [chase mice], then all reptiles are added as labels to the secondary classifier, resulting in a reduced subset of classes. In various embodiments, program 150 trains a plurality of dynamic models and performs a plurality of subsequent clustered (e.g., "top-level") classifications. In an embodiment, program 150 may perform multiple clustered classifications due to prohibitively large, subsequent, clusters (e.g., classifier subsets). In this embodiment, program 150 utilizes a cluster size threshold to control cluster sizes and subsequently created subset sizes (e.g., high confidence clusters). In a further embodiment, if a cluster size exceeds the cluster size threshold, program 150 adds another layer (e.g., cluster) in the grouping taxonomy (e.g., clustered classification), and creates another dynamic model based on the previously created dynamic model.

Accordingly, in this embodiment, program 150 addresses performance constraints, as described above, by splicing a classification task into two or more separate classification task such that a classification task takes significant less time to accurately classify an input compared to performing a single classification using the original large-label classifier, while not losing any information or sacrificing classification accuracy.

Program 150 performs a classification (step 212). Program 150 solves a classification task or problem utilizing any combination of a static model and a plurality of dynamically trained classifiers. In an embodiment, program 150 utilizes a final dynamic model (e.g., model trained with an acceptable training corpus cluster size), to perform one or more classifications of unlabeled inputs. In various embodiments, program 150 deploys a finalized dynamic model (e.g., models 152) to a plurality of production environments or respective production, test, or auxiliary environments. In another embodiment, program 150 determines which deployment environment to deploy a model out of a plurality of deployment environments (e.g., test, production, backup server, containers, or virtual machines). In an embodiment, the user instructs program 150 to deploy a specific model to a specific environment. In another embodiment, program 150 utilizes the deployed model to classify one or more images.

Accordingly, in this embodiment, program 150 results in a computationally intensive exercise had been reduced to a plurality of lesser steps, each significantly less computationally intensive than the original. In an embodiment, said steps are executed consecutively, allowing a classification operation that takes a fraction of the time to complete compared to the single, large label classifier.

Figure 3:
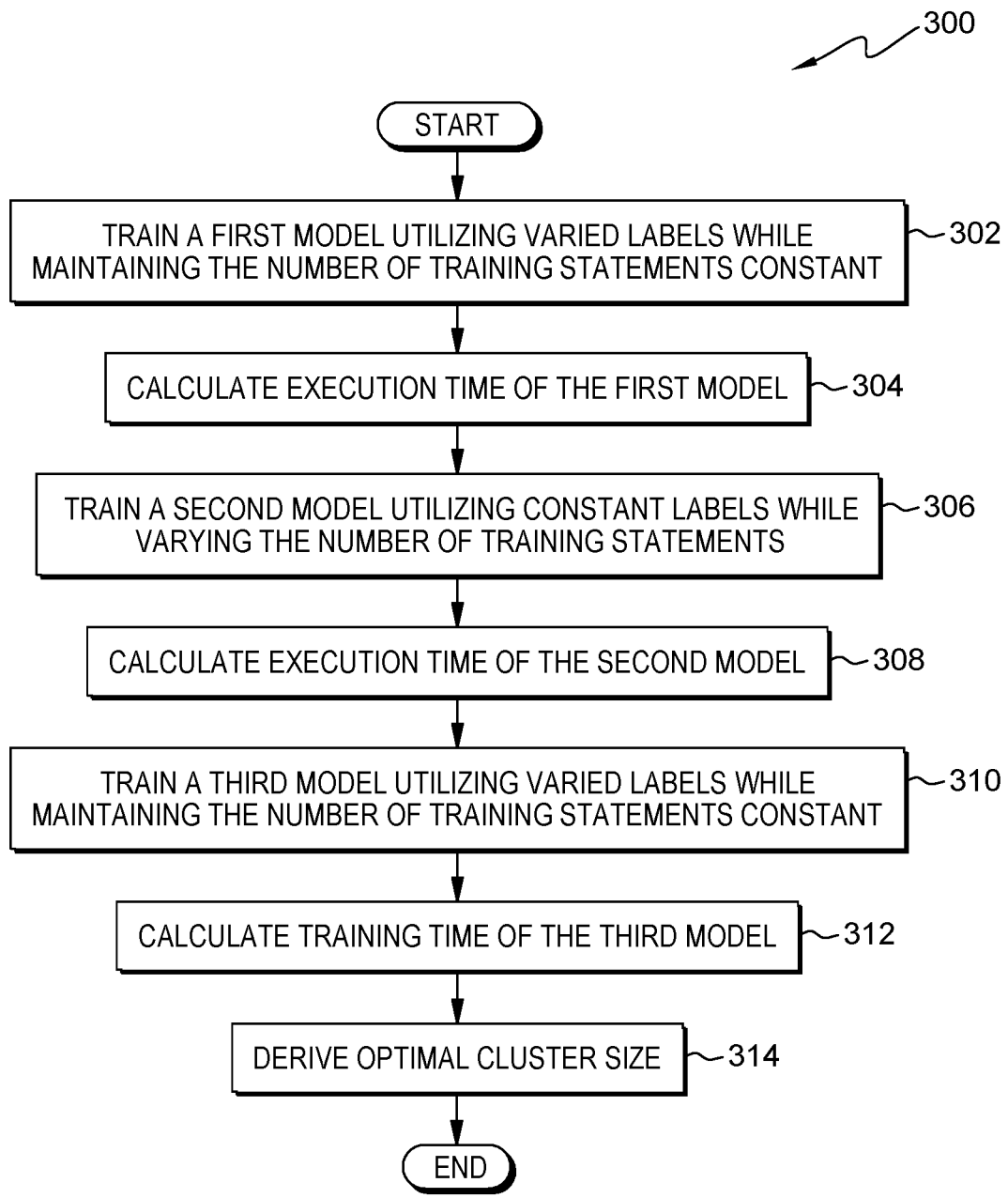
FIG. 3 is a flowchart depicting operational steps of a program, on a server computer within the computational environment of FIG. 1, for deriving an optimal cluster size, in accordance with an embodiment of the present invention.

FIG. 3 is a flowchart depicting operational steps of program 150 for deriving an optimal cluster size, in accordance with an embodiment of the present invention.

Program 150 trains a first model utilizing varied labels while maintaining the number of training statements constant (step 302). Program 150 utilizes the original, non-modified detected, received, or retrieved training sets, detailed in step 202, train a plurality of temporary models based on said training sets and associated training statements. In an embodiment, program 150 trains the plurality of models utilizing supervised training methods, as described in step 208. In various embodiments, program 150 utilizes a varied number of classes or labels for such model trained but maintains the amount of associated training statements per class constant. Program 150 partitions the labels into a plurality of training subsets, each with varying labels and constant amounts of associated training statements. For example, a training corpus utilized in this step may originally have 500 labels with 10,000 training statements per label. In this example, program 150 partitions the corpus into 5 training subsets, each with a varying range of (e.g., 2-500) labels and 10,000 associated training statements.

Program 150 calculates an execution time of the first model (step 304). In an embodiment, as program 150 trains the models, program 150 parallelly calculates and logs model statistics such as system memory utilization, central processing unit (CPU) utilization, graphics processing unit (GPU) utilization, hard drive utilization, total training duration, and model execution durations. In this embodiment, program 150 utilizes multiple estimations of execution performance to generate a generalized execution measure of the models. Program 150 empirically determines a classification time for a given data set utilizing the models trained with constant input (e.g., training statements) but varied sample label sizes of the original dataset, as described in step 302. Responsively, program 150 utilizes an average number of training statements across a training corpus. In an embodiment, program 150 plots and derives classification time as a function of number of labels. In various embodiments, program 150 fits and calculates a representative polynomial curve. For example, program 150 trains a model 2500 labels and 20 training statements per label, and determines a non-linear relationship describing a time needed to perform a classification (e.g., execution) as a function of number of labels.

Program 150 trains a second model utilizing constant labels while varying the number of training statements (step 306). In an embodiment, fewer labels reduce execution time, as detailed in step 302, but said reduction naturally results in increased training statements per label. Program 150 utilizes the same training procedure described in step 302 but program 150 maintains constant labels and varies the amount of associated training statements per label. Program 150 partitions a training corpus into a plurality of training subsets, each with constant labels and varied amounts of associated training statements. For example, a training corpus utilized in this step may originally have 500 labels with 10,000 training statements per label. In this example, program 150 partitions the corpus into 5 training subsets, each with 500 labels and a varied amount of (any number between 1-10,000) associated training statements. In an embodiment, classification time is a function of the number of training statements per label. In another embodiment, classification time is a function of decreasing clusters, logically more clusters result in fewer associated training statements.

Program 150 calculates an execution time of the second model (step 308). Program 150 utilizes the same procedure in step 304 to plot and derive an execution time based on a modal trained with a varying number of training statements but constant labels. In an embodiment, program 150 plots a time to classify a constant input value as a function of number of training statements and derives an equation expressing said time. In an example, program 150 calculates a linear relationship between increasing labels and the number of required clusters. In this example, larger amounts of clusters correlate to a smaller number of labels.

Program 150 trains a third model utilizing varied labels while maintain the number of training statements constant (step 310). Program 150 utilizes the same training procedure described in steps 302 and 306 but program 150 maintains constant training statements and varies the labels, as described specifically in step 302. Program 150 partitions the labels into a plurality of training subsets, each with varying labels and constant amounts of associated training statements. For example, a training corpus utilized in this step may originally have 500 labels with 10,000 training statements per label. In this example, program 150 partitions the corpus into 5 training subsets, each with a varying range of (e.g., 2-500) labels and 10,000 associated training statements.

Program 150 calculates a training time of the third model (step 312). Program 150 empirically determine a training time for a plurality of training subsets of the original dataset by considering a range of number of labels. In an embodiment, program 150 plots and derives a training time equation as a function of number of labels. In a further embodiment, program 150 fits a polynomial curve and calculates an associated equation representing the curve. For example, program 150 determines a non-linearly dependence on the number of labels for a required training time.

Program 150 derives an optimal cluster size (step 314). Program 150 calculates and derives a function (e.g., equation) that predicts an optimal (e.g., minimizes training and execution time) cluster size based on training statement distribution, label distribution and associated training and execution times. In an embodiment, program 150 utilizes the equations calculated and derived in steps 302, 306, and 310 to predict an optimal cluster size. Program 150 utilizes the average number of labels per cluster and the average number of training statements per cluster label as inputs to said clustering function. In various embodiments, program 150 utilizes the estimated time to perform a preliminary classification (step 302), adjusting it for the number of training statements per cluster label (step 306), and calculate the estimated time to train a subset of data where the largest number of clusters is a predefined constant. Here, program 150 calculates the estimated time to perform the final classification based on n labels where n is the labels per cluster (step 302) multiplied by the top number of clusters (the predefined constant referenced in step 310). In various embodiments, program 150 adds the functions from the steps above, plots, and derives a function representing the optimal cluster size. This function shows the speed at which program 150 classifies unknown text compared to the time to classify the same text against the original large classifier. Here, any value below 1 represents a time compression. In an embodiment, program 150 utilizes said function to represent the optimal number of classes that should be used for the pre-classification. In an alternative embodiment, where an unsupervised clustering technique is utilized, then said function represents the number of clusters the technique should create. In another embodiment, program 150 determines a saddle point or minima that allows for an even distribution between clusters and number of labels per cluster. In an embodiment, program 150 can estimate an optimal cluster by utilizing a square root of the number of labels of the training corpus of the original classifier.

Accordingly, in this embodiment, optimization parameters and derive equation are strongly influenced by the nature of the corpus, the average number of training statements per label as well as any associated thresholds (how many labels from the pre-classification task are passed to the final classification task).

Figure 4:
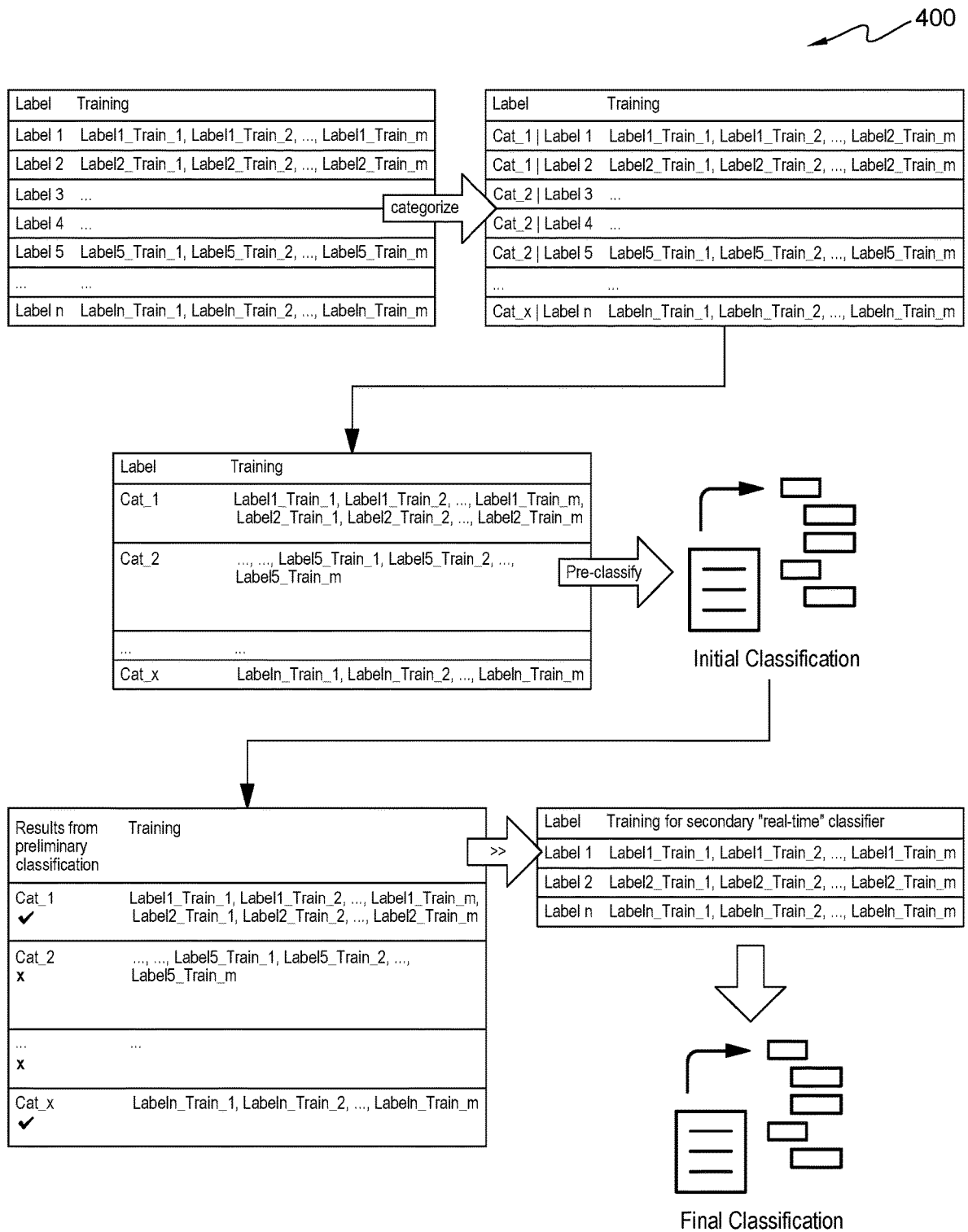
FIG. 4 illustrates an example depicting the creation, training, and utilization of a dynamic classification model, in accordance with an embodiment of the present invention.

FIG. 4 illustrates an example depicting the creation, training, and utilization of a dynamic classification model, in accordance with an embodiment of the present invention. In this example, program 150 utilizes a created dynamic model to output (e.g., classify) a list of candidate book classifications dependent on inputted keywords (e.g., natural language strings). Program 150 clusters a training set of candidate book according to language (e.g., English, Finnish, etc.) of a book, associated as metadata (e.g., feature). Generally, languages may serve as a natural group (e.g., cluster) of books. Here, program 150 clusters by the language of a book. In this example, a static model is trained with a plurality (e.g., thousands) of clusters of candidate books containing a label (e.g., class) with associated titles and subtitles utilized as training statements. The static model selects the top results (e.g., highest confidence clusters exceeding a confidence threshold) for an input (e.g., training cluster), for example English and French, and dynamically creates and trains, in real time, a secondary classifier (e.g., dynamic model) based on the initial classification (e.g., cluster classification). Program 150 utilizes the dynamic model to perform the final classification (e.g., classification of a book). In this example, performance gains are sensitive to the number of labels, the number of sub structures, and the number of labels per sub structure. In an embodiment, program 150 utilizes Naive-Bayes where performance is gained as the number of labels grow.

Figure 5:
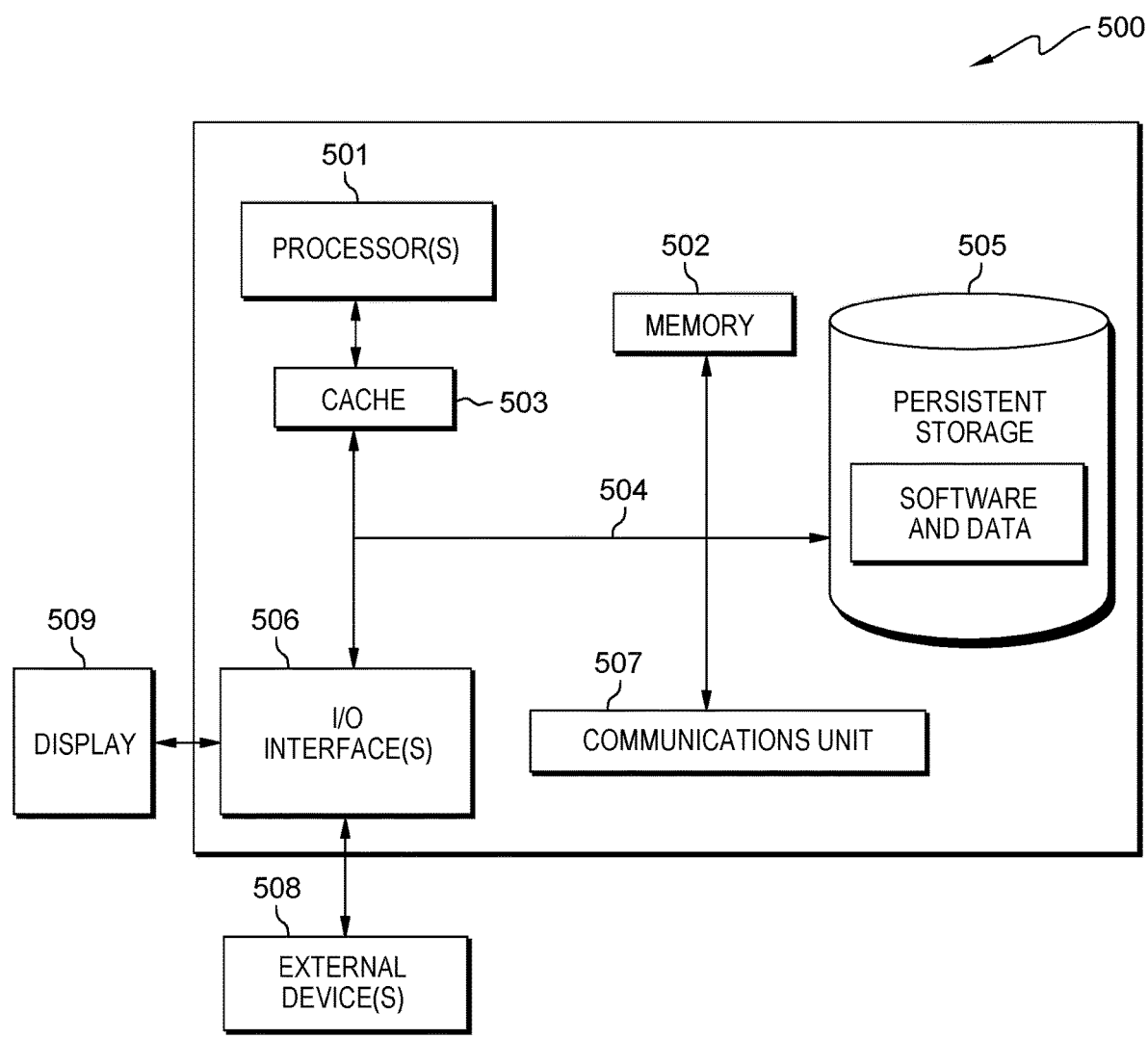
FIG. 5 is a block diagram of components of the server computer, in accordance with an embodiment of the present invention.

FIG. 5 depicts a block diagram of components of server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 120 each include communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Program 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program 150 may be downloaded to persistent storage 505 through communications unit 507.

I/O interface(s) 506 allows for input and output of data with other devices that may be connected to server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, an optimal cluster size;
   generating, by one or more computer processors, one or more clusters from one or more classes and respectively associated training statements that are contained in a training set, based on the determined optimal cluster size, wherein the one or more generated clusters, respectively, contain fewer classes than the training set;
   identifying, by one or more computer processors, one or more isolated high confidence classes and associated training statements from one or more cluster classifications generated by a static model trained with the one or more generated clusters;

creating, by one or more computer processors, one or more dynamic models trained with the one or more identified isolated high confidence classes; and performing, by one or more computer processors, one or more classifications utilizing the one or more created dynamic models.

2. The method of claim 1, wherein determining the optimal cluster size, comprises:

creating, by one or more computer processors, a first model trained with a plurality of varied classes and a constant amount of associated training statements;

calculating, by one or more computer processors, a first equation representing an execution duration for the first model;

creating, by one or more computer processors, a second model trained with a plurality of constant classes and a varied amount of associated training statements;

calculating, by one or more computer processors, a second equation representing an execution duration for the second model;

creating, by one or more computer processors, a third model trained with the plurality of varied classes and the constant amount of associated training statements;

calculating, by one or more computer processors, a third equation representing a training duration for the third model; and determining, by one or more computer processors, a cluster size utilizing the calculated first, second, and third equations, resulting in a largest execution time compression.

3. The method of claim 1, wherein generating one or more clusters from the one or more classes and the respectively associated training statements that are contained in the training set, based on the determined optimal cluster size, wherein the one or more generated clusters, respectively, contain fewer classes than the training set, comprises:

grouping, by one or more computer processors, logically, the one or more classes and associated training statements, contained in the training set, utilizing unsupervised clustering.

4. The method of claim 1, wherein identifying the one or more isolated high confidence classes and the associated training statements from the one or more cluster classifications generated by the static model trained with the one or more generated clusters, comprises:

responsive to exceeding a cluster confidence threshold, creating, by one or more computer processors, one or more dynamic models trained with the one or more cluster classifications.

5. The method of claim 4, wherein the cluster confidence threshold represents a minimum confidence level required to create the one or more dynamic models trained with the one or more cluster classifications.

6. The method of claim 1, further comprising:

deploying, by one or more computer processors, the one or more created dynamic models to one or more production environments.

7. The method of claim 1, wherein creating the one or more dynamic models trained with the one or more identified isolated high confidence classes, comprises:

creating, by one or more computer processors, one or more dynamic models trained in real-time.

8. A computer program product comprising:

one or more computer readable storage media and program instructions stored on the one or more computer readable storage media, the stored program instructions comprising:

program instructions to determine an optimal cluster size;

program instructions to generate one or more clusters from one or more classes and respectively associated training statements that are contained in a training set, based on the determined optimal cluster size, wherein the one or more generated clusters, respectively, contain fewer classes than the training set;

program instructions to identify one or more isolated high confidence classes and associated training statements from one or more cluster classifications generated by a static model trained with the one or more generated clusters;

program instructions to create one or more dynamic models trained with the one or more identified isolated high confidence classes; and program instructions to perform one or more classifications utilizing the one or more created dynamic models.

9. The computer program product of claim 8, wherein the program instructions, to determine the optimal cluster size, stored on the one or more computer readable storage media comprise:

program instructions to create a first model trained with a plurality of varied classes and a constant amount of associated training statements;

program instructions to calculate a first equation representing an execution duration for the first model;

program instructions to create a second model trained with a plurality of constant classes and a varied amount of associated training statements;

program instructions to calculate a second equation representing an execution duration for the second model;

program instructions to create a third model trained with the plurality of varied classes and the constant amount of associated training statements;

program instructions to calculate a third equation representing a training duration for the third model; and program instructions to determine a cluster size utilizing the calculated first, second, and third equations, resulting in a largest execution time compression.

10. The computer program product of claim 8, wherein the program instructions, to generate one or more clusters from the one or more classes and the respectively associated training statements that are contained in the training set, based on the determined optimal cluster size, wherein the generated one or more clusters, respectively, contain fewer classes than the training set, stored on the one or more computer readable storage media comprise:

program instructions to group, logically, the one or more classes and associated training statements, contained in the training set, utilizing unsupervised clustering.

11. The computer program product of claim 8, wherein the program instructions, to identify the one or more isolated high confidence classes and the associated training statements from the one or more cluster classifications generated by the static model trained with the one or more generated clusters, stored on the one or more computer readable storage media comprise:

program instructions to, responsive to exceeding a cluster confidence threshold, create one or more dynamic models trained with the one or more cluster classifications.

12. The computer program product of claim 11, wherein the cluster confidence threshold represents a minimum confidence level required to create one or more dynamic models trained with the cluster classifications.

13. The computer program product of claim 8, wherein the program instructions stored on the one or more computer readable storage media comprise:
   program instructions to deploy the one or more created dynamic models to one or more production environments.

14. The computer program product of claim 8, wherein the program instructions, to create the one or more dynamic models trained with the one or more identified isolated high confidence classes, stored on the one or more computer readable storage media comprise:
   program instructions to create one or more dynamic models trained in real-time.

15. A computer system comprising:
   one or more computer processors;
   one or more computer readable storage media; and
   program instructions stored on the computer readable storage media for execution by at least one of the one or more processors, the stored program instructions comprising:
      program instructions to determine an optimal cluster size;
      program instructions to generate one or more clusters from one or more classes and respectively associated training statements that are contained in a training set, based on the determined optimal cluster size, wherein the one or more generated clusters, respectively, contain fewer classes than the training set;
      program instructions to identify one or more isolated high confidence classes and associated training statements from a cluster classification generated by a static model trained with the one or more generated clusters;
      program instructions to create one or more dynamic models trained with the one or more identified isolated high confidence classes; and
      program instructions to perform one or more classifications utilizing the one or more created dynamic models.

16. The computer system of claim 15, wherein the program instructions, to determine the optimal cluster size, stored on the one or more computer readable storage media comprise:
   program instructions to create a first model trained with a plurality of varied classes and a constant amount of associated training statements;
   program instructions to calculate a first equation representing an execution duration for the first model;
   program instructions to create a second model trained with a plurality of constant classes and a varied amount of associated training statements;
   program instructions to calculate a second equation representing an execution duration for the second model;
   program instructions to create a third model trained with the plurality of varied classes and the constant amount of associated training statements;
   program instructions to calculate a third equation representing a training duration for the third model; and
   program instructions to determine a cluster size utilizing the calculated first, second, and third equations, resulting in a largest execution time compression.

17. The computer system of claim 15, wherein the program instructions, to generate one or more clusters from the one or more classes and the respectively associated training statements that are contained in the training set, based on the determined optimal cluster size, wherein the one or more generated clusters, respectively, contain fewer classes than the training set, stored on the one or more computer readable storage media comprise:
   program instructions to group, logically, the one or more classes and associated training statements, contained in the training set, utilizing unsupervised clustering.

18. The computer system of claim 15, wherein the program instructions, to identify the one or more isolated high confidence classes and the associated training statements from the one or more cluster classifications generated by the static model trained with the one or more generated clusters, stored on the one or more computer readable storage media comprise:
   program instructions to, responsive to exceeding a cluster confidence threshold, create one or more dynamic models trained with the one or more cluster classifications.

19. The computer system of claim 18, wherein the cluster confidence threshold represents a minimum confidence level required to create one or more dynamic models trained with the cluster classifications.

20. The computer system of claim 15, wherein the program instructions stored on the one or more computer readable storage media comprise:
   program instructions to deploy the one or more created dynamic models to one or more production environments.

* * * * *